Nov. 13, 1945.  T. A. BAKER  2,388,669
FLUID PROPORTIONING SYSTEM
Original Filed May 12, 1942
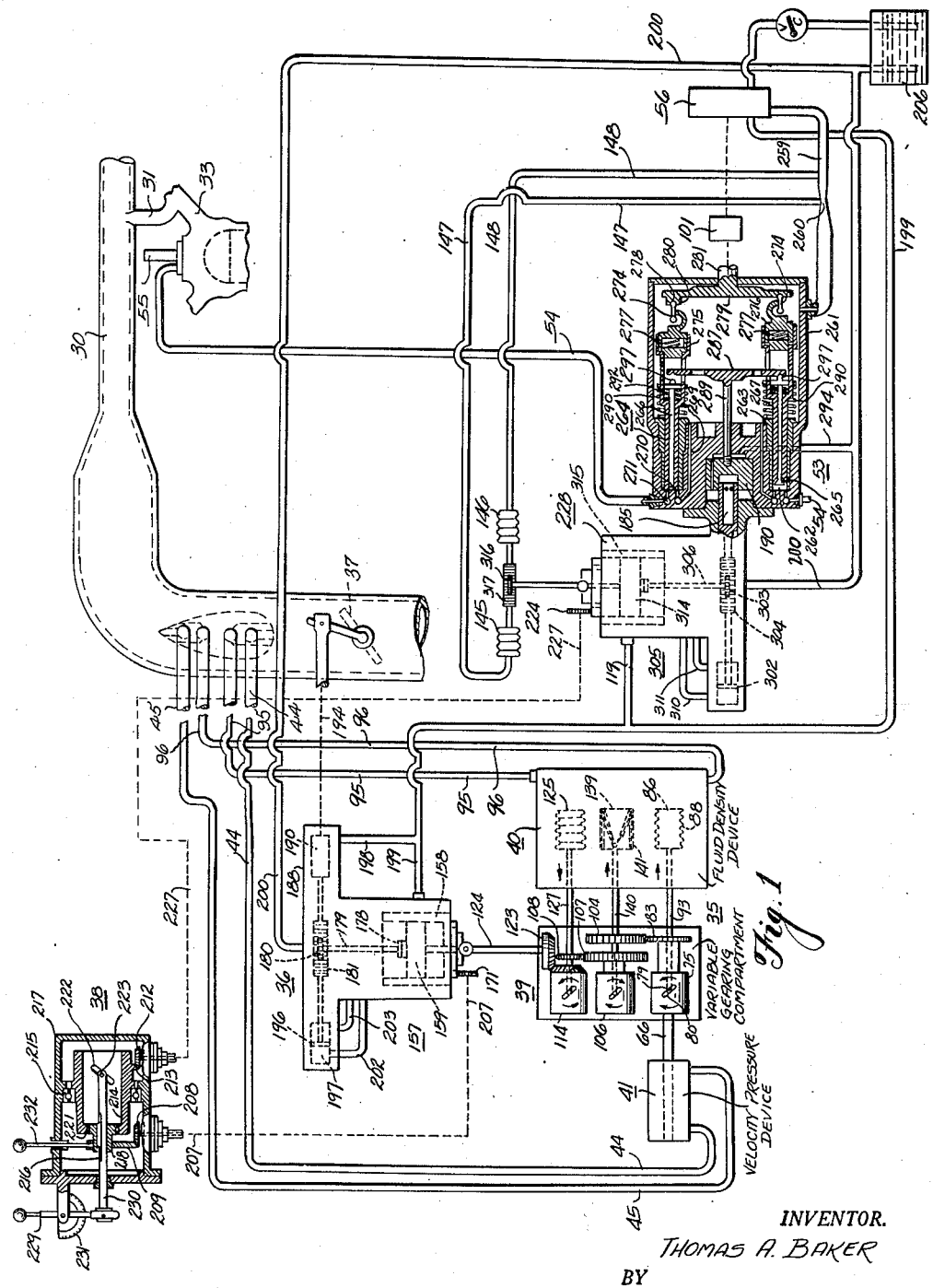
INVENTOR.
THOMAS A. BAKER
BY
Hoodling and Krost
attys Patented Nov. 13, 1945

2,388,669

UNITED STATES PATENT OFFICE 2,388,669

FLUID PROPORTIONING SYSTEM

Thomas A. Baker, Logansport, Ind.

Original application May 12, 1942, Serial No. 442,711. Divided and this application December 24, 1942, Serial No. 470,016

10 Claims. (Cl. 123—139)

My invention relates in general to fluid measuring system and more particularly to air and liquid measuring system wherein the quantity of liquid and the quantity of air may be separately determined and wherein the ratio of air delivery to liquid delivery may be varied to meet certain requirements.

Although my invention will be described in connection with the supplying of a measured quantity of liquid fuel and a measured quantity of air to an internal combustion engine, yet it is to be understood that my invention is adaptable to other uses.

An object of my invention is the provision of measuring the quantity of liquid delivered through a flow duct passage.

Another object of my invention is the provision of measuring the quantity of air which flows through an air duct passage.

Another object of my invention is the provision of measuring the quantity of air passing through an air duct passage wherein the provision compensates for the density of the air flowing through the air duct passages.

Another object of my invention is the provision of compensating for changes in the density of the air while measuring the quantity of the flow of air through an air duct passage.

Another object of my invention is the provision of maintaining the quantity of the flow of air in an air duct passage at a predetermined value or setting, wherein the predetermined value or setting is compensated for changes in the density of the air.

Another object of my invention is the provision of controlling the amount of the flow of air through an air duct passage while automatically compensating for variable changes in the density of the air.

Another object of my invention is the provision of compensating for variable changes in the temperature, in the humidity, and in the absolute pressure of the air passing through an air duct passage while controlling and determining the quantity of the flow of air through the air duct passage.

Another object of my invention is the provision of a metering pump device capable of measuring the liquid fuel in a predetermined quantity as determined by pressure condition of the flow of the fluid and of causing the time discharge of the measured liquid fuel to the nozzle valve of the internal combustion engine at the proper interval.

Another object of my invention is the provision of transmitting the movement of an air weighing apparatus to a control vane or other control device in an air duct passage, whereby the quantity of the flow of air through the air duct passage may be maintained at a predetermined value or setting.

Another object of my invention is the provision of measuring the quantity of liquid which flows through a liquid duct passage and of maintaining the flow of liquid through the liquid duct passage at a predetermined value or setting.

Another object of my invention is the provision of using the pressure of the liquid flowing in the liquid duct passages for operating the motion transmitting means between the liquid measuring device and the control means which governs the amount of liquid flowing through the air duct passage.

Another object of my invention is the provision of using the pressure of the liquid in the liquid duct passage for supplying the energy for transmitting motion between the air measuring apparatus and the control vanes which govern the flow of air through the air duct passage.

Another object of my invention is the provision of supplying both air and liquid fuel to an internal combustion engine and of varying the ratio of the quantity of air to the quantity of liquid fuel delivered to the engine.

Another object of my invention is the provision of a liquid pump, wherein the volume delivery of the pump may be varied by changing the stroke of a plurality of radially extending pistons by a suitable eccentric and variably adjustable crank head.

Another object of my invention is the provision of a fluid pressure follower apparatus arranged to control the flow of the air passing through an air duct passage or the liquid through a liquid duct passage in which the fluid pressure follower apparatus is governed by a pilot piston.

Other objects and a fuller understanding of my invention may be had by referring to the following description and claims, taken in conjunction with the accompanying drawing, in which like parts are designated by like reference characters and, in which:

The figure represents a diagrammatic illustration of a system for supplying both air and liquid to an internal combustion engine wherein the quantity of air and the quantity of the liquid are both measured and wherein the ratio of the delivery of the air to the delivery of the liquid may be adjustably varied with reference to each other.

With reference to the drawing, which shows the diagrammatic illustration of my invention, I illustrate my air control apparatus supplying air to the cylinder 33 of an internal combustion engine and my fuel control apparatus for supplying fuel to the cylinder 33 of the internal combustion engine. The controlled air is supplied to the cylinder 33 through a conduit 30 and a branch conduit 31. In the drawing only one cylinder of the internal combustion engine is illustrated and it is to be understood that the air duct 30 leads to the other cylinders of the engine. Any suitable means for establishing air under pressure may be employed to supply the air duct 30. The fuel to the cylinder 33 is supplied through a fuel pipe 54 and is controlled by an illustrated valve 55 mounted on top of the cylinder 33.

In my invention the air which is supplied to the cylinder 33 is measured in terms of the quantity of air which is passing a given point in a given period of time. The mechanism for weighing or measuring the air passing through the air duct 30 is indicated generally by the reference character 35. The resultant movement of the air weighing mechanism 35 is transmitted through a shaft 124 to a motion transmitting means indicated generally by the reference character 36 which controls the position of the control vane 37 in the air duct 30. The motion transmitting means 36 is governed by a throttle device indicated generally by the reference character 38 which adjustably varies the amount of air passing through the air duct 30 to the internal combustion engine. Accordingly, through the combined action of the air measuring mechanism 35 and the motion transmitting means 36, the quantity of air passing through the air duct 30 may be maintained at a definite predetermined value or setting as regulated by the throttle device 38.

The fuel which is delivered to the internal combustion engine 33 through the supply conduit 54 is fed by a pump 56 from a supply tank 206. The fuel upon leaving the pump passes through a venturi 260 and then into a liquid metering or measuring device indicated generally by the reference character 53, after which the measured liquid is supplied to the cylinder 33 through a supply duct 54. Although only one outlet 54 is illustrated for the liquid metering device it is to be understood that the liquid metering device has as many outlets as there are cylinders in the engine to be supplied. The liquid metering device 53 and the pump 56 may be driven by a common source of motive power indicated generally by the reference character 101. The liquid metering device 53 is capable of having a variable volume delivery which governs the flow of the amount of fluid to the cylinders of the internal combustion engine. The variable volume delivery of the liquid metering device is controlled by a motion transmitting means 228 which in turn is responsive to two opposing pressure bellows 145 and 146, each being respectively responsive to the low and high pressure condition at the venturi 260. The motion transmitting means 228 is governed by the throttle device 38 as indicated by the dotted line 227 which may comprise a flexible shaft for driving the gear 224. Consequently, the combined action of the liquid metering device 53 and the motion transmitting means 228 provide for maintaining the flow of fluid to the cylinder 33 of a predetermined value or quantity as governed by the setting of the throttle 38. The combined action of my air control mechanism and of my fluid control mechanism as governed by the throttle 38 is such that the proper amount of air and the proper amount of fuel is delivered to the cylinder of the internal combustion engine to give high efficient results. The throttle device 38 is provided with two dual-control levers indicated by the reference characters 229 and 232, the control lever 232 being the throttle lever and the lever 229 being the ratio mixing lever which varies the ratio of air supplied to the cylinder with reference to the amount of fuel supplied to the cylinder.

My fluid flow responsive mechanism 35 comprises generally a variable gearing compartment indicated by the reference character 39 and a density factor compartment indicated by the reference character 40 and a velocity pressure unit indicated generally by the reference character 41. The density factor compartment 40 is arranged to receive a continual sampling of the air from the air duct 30. The continuous sampling of the air from the air duct 30 is supplied through the density factor compartment 40 through a duct 95 and is returned back to the air duct 30 through an air passage 96. The air is continually circulated through the density factor compartment 40 by reason of the fact that the air duct 95 is responsive to the total pressure of the air in the air duct 30 whereas the air duct 96 is responsive to the static pressure of the air in the air duct 30, thereby producing a differential pressure which forces the air continually through the density factor compartment. In the top of the density factor compartment 40 is mounted a temperature responsive bellows 125, in the middle of the compartment is mounted a moisture responsive device 139 and in the bottom of the compartment is mounted an absolute pressure responsive device 86. These three responsive devices give a movement or measurment which is a function of the density of the air by-passed through the density factor compartment 40 from the air supply duct 30 to the internal combustion engine. In other words, in my fluid flow responsive device I compensate for changes in the density of the air so that a true measurement or movement is given which corresponds to the actual quantity or weight of air passing through the duct 30. The temperature responsive bellows 125 may be suitably anchored to the side wall of the density factor compartment 40. As the temperature of the air in the compartment increases the bellows actuate the shaft 127 to the left. The moisture responsive device 139 comprises a plurality of moisture responsive elements 141 so that as the moisture responsive elements 141 change their elongation the shaft 140 is moved in a transverse direction. The moisture responsive elements 141 may be made of any suitable material and I find that human hair is of the nature to give satisfactory results although the moisture responsive elements are not limited to the employment of hair but include any other material. Also, it is to be understood that the moisture responsive device 139 may be of a form entirely different from that shown in the drawing which is but one embodiment of several types of moisture responsive devices. As the sampling of the air which passes through the density factor compartment 40 increases in moisture content, the shaft 140 moves to the right as shown in the drawing. The absolute pressure responsive device 86 comprises generally a bellows 88 and the movement of the bellows 88 is responsive to the absolute pressure of the air passing through the density factor compartment 40. As the absolute pressure increases, the shaft 93 moves to the right as shown in the drawing.

The weight of air or the quantity of air which passes a given point in a given period of time is a function of the density of the air and the velocity pressure of the air as it passes through a conduit. In my invention the density of the air is compensated for by the combined action of the temperature responsive device 125, the moisture responsive device 139, and the absolute pressure device 86. The velocity pressure of the air is measured or determined by the velocity pressure unit 41 which is connected to the air conduit 30 through a tube 44 which is responsive to the total pressure of the air within the air conduit 30 and through a tube 45 which is responsive to the static pressure of the air in the air conduit 30. The differential between the total pressure and the static pressure represents the velocity pressure of the air in the conduit 30 and accordingly the movement of the shaft 66 is responsive to the velocity pressure of the air in the conduit 30. An increase in the velocity pressure of the air tends to rotate the shaft 66 in a counterclockwise direction as shown by the arrow in the drawing. The shaft 66 actuates a variable rotor drive means 75 through means of a radially disposed pin 79, which engages an angularly disposed slot 80 in the wall of the variable rotor drive means 75 which comprises a cylindrical housing or drive member surrounding the shafts 66 and 93. The drive shaft 66 and the cylindrical housing or drive member are axially movable relative to each other, whereby the slidable movement of the pin 79 in the slot 80 varies the angular relationship between the drive shaft and the cylindrical housing or drive member. Actuation of the shaft 93 by the absolute pressure responsive device 86 causes the pin 79 to be moved within the angularly disposed slot 80, with the result that the movement of the shaft 93 provides for causing the gear 83 to be compensated for changes in the absolute pressure. In other words, the movement of the gear 83 is responsive to the velocity pressure device 41 as modified by the movement of the absolute pressure responsive device 86. The movement of the gear 83 is transmitted to a gear 104 which in turn drives a variable rotor drive means 106 through the arrangement of a pin and slot as illustrated. The variable rotor drive means 106 drives the gear 107 but the transmission of motion from the variable rotor drive means 106 to the gear 107 is modified by the movements of the shaft 140 which is actuated by the humidity device 139. In other words, the movement of the gear 107 is compensated for by reason of changes in the humidity. The movement of the gear 107 is transmitted to a gear 108 which in turn transmits movement to a variable rotor drive means 114 through the pin and slot arrangement as illustrated. The movement of the variable rotor drive means 114 is transmitted to the gear 123 but the transmission of movement is modified by the actuation of the shaft 127 which is connected to the temperature responsive device 125. That is to say, the movement of the variable rotor drive means 114 to the gear 123 is compensated for by changes in the temperature. The construction of the fluid responsive device 35 with its component parts; namely, the variable gearing compartment 39, the fluid density device 40, and the velocity pressure device 41 may be the same as that shown and described in my parent application Serial No. 442,711 filed May 12, 1942, for Fluid measuring and regulating mechanism, and in my divisional patent application Serial No. 459,410 filed September 23, 1942, for Fluid flow responsive device.

The shaft 124 may be characterized as a resultant output shaft because it is responsive to the movement of the velocity pressure unit 41 as modified by the temperature responsive unit 125, the moisture responsive unit 139 and the absolute pressure responsive unit 86. In other words, the resultant output shaft 124 produces a movement which is a measurement of the weight of the air or the quantity of the air in the duct 30 passing a given point in a given period of time. Thus the resultant output shaft 124 is a function of the velocity pressure and the density as measured by the combined action of the temperature responsive device 125, the moisture responsive device 139 and the absolute pressure responsive device 86. The movement of the shaft 124 is arranged to govern the position of the control vane 37 within the conduit 30 through the motion transmitting means indicated by the reference character 36 in the figure of the drawing.

The motion transmitting means may be of the same construction as that shown and described in my parent application Serial No. 442,711 filed May 12, 1942, for Fluid measuring and regulating mechanism and comprises generally a master valve 157, a slidable and rotatable plunger 159 and a rotatable casing 158 which govern the flow of fluid to a pilot piston 196 that actuates a fluid follower mechanism 188 having a follower plunger 190 for actuating the vane 37. In operation, the setting of the master valve 157 is effected by rotating the rotatable casing 158 through means of a gear 207 actuated by the throttle 38 through a mechanical movement 207 which may comprise a flexible shaft. The slidable and rotatable plunger 159 of the master valve 157 is actuated by the shaft 124. The master valve 157 controls the position of the fluid follower plunger 190 by governing the flow of the fluid which is admitted to opposite sides of the pilot piston 196. Fluid is admitted under pressure from the pump 56 through the fluid inlet duct 199 to the master valve 157, and through control ports within the master valve 157 fluid is admitted to or exhausted from the pilot cylinder 197 through the fluid ducts 202 and 203. Fluid to the follower plunger 190 is admitted through a fluid duct 198 and the operation is such that the follower plunger 190 follows the movements of the pilot piston 196. The exhaust fluid flows through the fluid duct 200 to the supply reservoir 206. When the master valve is in its neutral or normal position, the two engaging discs of the clutch 178 hold the pilot piston 196 in a fixed position through the shaft 179, the pinion gear 180, and the rack teeth 181 with the result that the control vane 37 within the air duct 30 is maintained in a fixed position for controlling the flow of the air to the internal combustion engine. In other words, the clutch 178 mechanically connects the pilot valve 196 to the shaft 124. The clutch is released when fluid is admitted to the pilot cylinder 197 for actuating the pilot piston 196. The combined action of the fluid flow responsive mechanism 35, the master valve 157, and the fluid pressure follower mechanism 188 is such that in the event the quantity of the air flowing through the duct 30 changes, the control vane is repositioned to cause the quantity of the air to be maintained at a predetermined value or setting as determined by the throttle device 38. The effect produced by rotating the rotatable casing 158 is such as to change the setting of the master valve 157 to produce a corresponding re-positioning of the control vane 37.

The re-positioning of the rotatable casing 158 is effected by moving the throttle lever 232 which actuates a gear segment 209 that engages the bevel gear 208 connected to the flexible drive shaft 207. The gear segment 209 is keyed or secured to a hub 218. The throttle lever 232 may be moved to any one of many adjustable positions. In operating the flexible shaft 207 for turning the gear 171 for rotating the rotatable casing 158, it is only necessary for the operator to move the throttle lever 232 to any desired operating position. The actuation of the throttle lever 232 also rotates the rotor 214 which rotates the bevel gear 212 through a gear segment 213. The rotation of the bevel gear 212 operates the flexible shaft 227 which turns the gear wheel 224 for governing the motion transmitting means 228 that varies the operation of the liquid metering device 53. The change in the rotation of the gear 224 through the motion transmitting means 228 varies the amount of liquid delivered from the liquid metering device 53 to the cylinders of the internal combustion engine. The ratio between the amount of air and the amount of liquid fuel supplied to the internal combustion engine is regulated by the ratio mixing lever 229 of the throttle device 38. A movement of the ratio mixing lever 229 operates a shaft 230 which carries at the right-hand end thereof two cross-pins 223 which engage angular slots 222 in the rotor 214. The shaft 230 is provided with a sliding key connection 216 which enables the shaft 230 to be axially movable with reference to the hub 218 but which rotates with the hub when the throttle lever 232 is moved. The rotor 214 is supported externally by ball bearings 215 and internally about ball bearings 221. The arrangement of the rotor 214 and the two cross-pins 223 fitting in the angular slot 222 is of substantially the same construction as the variable rotor drive means 75, 106 and 114 of the air measuring mechanism 35 shown and described in my parent application No. 442,711, filed May 12, 1942 for Fluid measuring and regulating mechanism and in my divisional application, Serial No. 459,410, filed September 23, 1942, for Fluid flow responsive device. The ratio mixing lever 229 is arranged to be held in any one of a number of adjustable positions by making engagement with a semi-circular ratchet member 231. In operation, the ratio mixing lever 229 is actuated to produce the most efficient operation of the internal combustion engine by varying the ratio between the air supplied to the internal combustion engine and the fuel supplied to the internal combustion engine.

The liquid metering device 53 is substantially the same as that shown and described in my parent application No. 442,711, filed May 12, 1942, for Fluid measuring and regulating device, and my divisional application, Serial No. 470,015, filed December 24, 1942, for Liquid metering device, and comprises a housing 261 which is supplied by liquid fuel from the pump 56 through a feed pipe 259. Within the housing 261 there are arranged a plurality of annularly positioned cylinders indicated generally by the reference character 262. In the embodiment shown in the drawing there are eight of such annularly arranged cylinders 262. The cylinders 262 are formed by cylindrical sleeves 263 fitting into the housing 261. Within the cylindrical sleeves 263, I provide valve-like pistons 264 which govern the amount of fluid delivered to the internal combustion engine through the conduit 54. The valve-like piston 264 comprises a valve 265 having a stem 266 and a valve sleeve 267 on the outside of the valve stem 266. Each of the valve sleeves 267 is provided with a longitudinal duct not shown to direct fuel into the left-hand end of the cylinders 262. In addition, fluid may flow into the cylinder 262 through longitudinal ducts 269 passing through the internal body part of the liquid metering device. The fluid which flows through the longitudinal ducts 269 is required to pass by ball check valves 270 before entering the cylinders 262. The fluid which is ejected from the cylinders 262 upon the valve-like piston 264 moving to the left is ejected by the ball check valve 271 before entering the conduit 54 to the cylinder of the internal combustion engine.

The valve sleeve 267 extends to the right and is provided upon its right-hand end with a socket 275 which receives an actuating member 276 operated by a wheel 274 by a rotating plate 279. The wheels 274 are constrained against the rotating plate by means of springs 277 positioned inside of the actuating members 276. The rotating plate 279 is provided with a circular race-way 278 having a raised portion or cam 280 which when the wheel 274 rides thereover actuates the actuating member 276 to the left. When the left-hand end of the actuating member 276 engages the bottom of the socket 275, the movement of the wheel 274 is transmitted to the valve sleeve 267, preparatory to ejecting the fluid from the cylinders 262. The rotating plate 279 is driven by a drive shaft 281 which may be rotated by any suitable motive power means as indicated by the reference character 101.

The valve stems 266 are controlled by a positionable plate 287 engaging the caps 297 which rest upon the right-hand ends of the valve stems 266. The caps 297 are anchored to the valve stems 266 and springs 292 are arranged to bias the valve stems 266 to the right. The positionable plate 287 is connected to a follower plunger 190 by means of a shaft 289. Springs 290 are provided to urge the valve sleeves 267 to the right. The position of the positionable plate 287 is governed by the follower plunger 190 which in turn is controlled by a pilot plunger 185. The pilot plunger 185 is governed by a pilot piston 302 and a master valve 305 which is the same construction as the master valve 157 and which is a part of the motion transmitting means 228. The master valve 305 controls the pilot piston 302 in the same manner as the master valve 157 controls the pilot piston 196 that actuates the vane 37. The shaft 306 of the motion transmitting means 228 has a pinion gear 303 anchored on the end thereof and is arranged to mesh with rack teeth 304 for holding the pilot plunger 185 in a fixed position when the master valve 305 is in its neutral or normal position. Fluid under pressure from the pump is admitted to the master valve 305 through a pipe 119 and the flow of the fluid to and from the master valve 305 to the opposite side of the pilot piston 302 is caused to pass through ducts 310 and 311. The construction and operation of the motion transmitting means 228 is the same as that previously described with reference to the motion transmitting means 36 for governing the position of the control vane 37. The slidable and rotatable position of the plunger 314 of the master valve 305 is actuated by a gear 316 which meshes with the rack teeth 317 having the ends thereof respectively connected to the pressure actuating devices 145 and 146. The pressure responsive device 145 is connected by a duct 147 to the low pressure side of the venturi 260 in the feed pipe 259 from the pump 56, and the pressure responsive device 146 is connected by a duct 148 to the high pressure of the venturi 260. The differential pressure between the two responsive devices 145 and 146 is a function of the quantity of liquid or fuel flowing from the pump 56 to the metering device 53. Inasmuch as the motion transmitting means 228 is effective in producing a movement which corresponds to a function of the fluid flow through the venturi 260 and inasmuch as the motion transmitting means 228 controls the position of the follower plunger 190 as governed by the pilot piston 302, the position of the positionable plate 287 is likewise governed by the fluid flowing through the venturi 260. The position of the positionable plate 287 controls the point at which the valves 265 upon the left-hand end of the valve stems 266 close to begin to eject fuel from the cylinders 262. In other words, it is not until the valve sleeves 267 engage the valves 265 that the fluid is entrapped in the cylinders 262 at which point the ejection is initiated for measuring the quantity of fuel ejected by each movement of the valve-like piston 264. The farther that the positionable plate 287 is to the right the larger the volume of liquid ejected upon each reciprocal movement of the valve-like piston 264. That is to say, it is not until the caps 297 are pulled away from the positionable plate 287 that the valves 265 are closed which initiates the ejection action of the valve-like pistons 264. The rotatable casing 315 of the motion transmitting means 228 is governed by a gear 224 operated by the flexible shaft 227 from the throttle device 38. The rotation of the rotatable casing 315 with reference to the slidable and rotatable plunger 314 provides for repositioning the pilot plunger 185 which governs the location of the follower plunger 190 that actuates the positionable plate 287. The operation of the follower plunger 190 as controlled by the pilot plunger 185, which is supplied with fluid through the duct 294, is the same as the operation of the follower plunger 190 that actuates the control vane 37. Consequently, the amount of fluid ejected from the cylinders 262 upon each reciprocal movement of the valve-like piston 264 is controlled by the throttle device 38. In addition, the differential action of the pressure responsive devices 145 and 146 maintains the volume of each ejection of the valve-like piston 264 in accordance with the amount of fluid flowing through the venturi 260. My system provides for supplying both air and liquid fuel to an internal combustion engine and of varying the ratio of the quantity of air to the quantity of liquid fuel delivered to the engine.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a fluid control device including an air passage and a liquid passage jointly feeding a common chamber, first variable means for regulating the flow of the air through the air passage, second variable means for regulating the flow of the liquid through the liquid passage, the improvement of a joint regulating mechanism for operating the variable means comprising, in combination, operable control means having a first means for governing the first variable means and a second means for governing the second variable means, joint means for operating the first and second means, and variable connection means between the first and second means to vary the ratio between the amount of air and liquid delivered to the common chamber, said variable connection means including a common control member and two rotatable members actuated by the common control member, and means for moving the two rotatable members relative to each other.

2. In a fluid control device including an air passage and a liquid passage jointly feeding a common chamber, first variable means for regulating the flow of the air through the air passage, second variable means for regulating the flow of the liquid through the liquid passage, the improvement of a joint regulating mechanism for operating the variable means comprising, in combination, operable control means having a first means for governing the first variable means and a second means for governing the second variable means, joint means for operating the first and second means, variable connection means between the first and second means to vary the ratio between the amount of air and liquid delivered to the common chamber, means responsive to the air flowing through the air passage for maintaining the flow of air at a predetermined value, and means responsive to the liquid flowing through the liquid passage for maintaining the flow of liquid at a predetermined value.

3. In a fluid control device including an air passage and a liquid passage jointly feeding a common chamber, first variable means for regulating the flow of the air through the air passage, second variable means for regulating the flow of the liquid through the liquid passage, the improvement of a joint regulating mechanism for operating the variable means comprising, in combination, operable control means having a first means including a first fluid pressure device for governing the first variable means and a second means including a second fluid pressure device for governing the second variable means, joint means for operating the first and second means, variable connection means between the first and second means to vary the ratio between the amount of air and liquid delivered to the common chamber, means responsive to the air flowing through the air passage to operate the first fluid pressure device for maintaining the flow of air at a predetermined value, and means responsive to the liquid flowing through the liquid passage to operate the second fluid pressure device for maintaining the flow of liquid at a predetermined value.

4. In a fluid control device including at least a first and a second fluid feed passage, the improvement of a fluid proportioning device comprising, first variable means for regulating the flow of the fluid through the first feed passage, second variable means for regulating the flow of the fluid through the second feed passage, joint means for operating both said first and second variable means, and proportioning means for modifying the joint means to vary the ratio between the amount of fluid delivered by the first and second fluid feed passages, said proportioning means including a reciprocally mounted common control member and two rotatable members actuated by the common control member, and cam means governed by the reciprocal movements of the common control member for rotatively moving one of the rotatable members relative to the other.

5. In a fluid control device including at least a first and a second fluid feed passage, the improvement of a fluid proportioning device comprising, first variable means for regulating the flow of the fluid through the first feed passage, second variable means for regulating the flow of the fluid through the second feed passage, joint means for operating both said first and second variable means, proportioning means for modifying the joint means to vary the ratio between the amount of fluid delivered by the first and second fluid feed passages, said joint means having a first movable element for transmitting movement to the first variable means and having a second movable element for transmitting movement to the second variable means, and said proportioning means having means common to both said movable elements for varying the movements of said movable elements with respect to each other.

6. In a fluid control device for an internal combustion engine including an air passage and a fuel passage feeding a cylinder, the improvement of a feed proportioning device comprising first variable means for regulating the flow of the air through the air passage, second variable means for regulating the flow of the fuel through the fuel passage, joint means for operating both said first and second variable means, and proportioning means for modifying the joint means to vary the ratio between the amount of air and fuel delivered to the cylinder, said proportioning means including a common control member and two rotatable members actuated by the common control member, and means for moving the two rotatable members relative to each other.

7. In a fluid control device for an internal combustion engine including an air passage and a fuel passage feeding a cylinder, the improvement of a feed proportioning device comprising first variable means for regulating the flow of the air through the air passage, second variable means for regulating the flow of the fuel through the fuel passage, joint means for operating both said first and second variable means, proportioning means for modifying the joint means to vary the ratio between the amount of air and fuel delivered to the cylinder, said joint means having a first movable element for transmitting movement to the first variable means and having a second movable element for transmitting movement to the second variable means, and said proportioning means having means common to both said movable elements for varying the movements of said movable elements with respect to each other.

8. In a fluid control device for an internal combustion engine including an air passage and a fuel passage feeding a cylinder, the improvement of a feed proportioning device comprising first variable means for regulating the flow of the air through the air passage, second variable means for regulating the flow of the fuel through the fuel passage, joint means for operating both said first and second variable means, proportioning means for modifying the joint means to vary the ratio between the amount of air and fuel delivered to the cylinder, means responsive to the air flowing through the air passage for maintaining the flow of air at a predetermined value, and means responsive to the liquid flowing through the liquid passage for maintaining the flow of liquid at a predetermined value.

9. In a fluid control device including at least a first and a second fluid feed passage, the improvement of a fluid proportioning device comprising, first variable means for regulating the flow of the fluid through the first feed passage, second variable means for regulating the flow of the fluid through the second feed passage, joint means for operating both the said first and second variable means, proportioning means for modifying the joint means to vary the ratio between the amount of fluid delivered by the first and second fluid feed passages, means responsive to the fluid flowing through the first passage for maintaining the flow of fluid at a predetermined value, and means responsive to the fluid flowing through the second passage for maintaining the flow of fluid at a predetermined value.

10. In a fluid control device for an internal combustion engine including an air passage and a fuel passage feeding a cylinder, the improvement of a feed proportioning device comprising first variable means including means compensating for changes in the density of the air for regulating the flow of the air through the air passage, second variable means for regulating the flow of the fuel through the fuel passage, joint means for operating both said first and second variable means, and proportioning means for modifying the joint means to vary the ratio between the amount of air and fuel delivered to the cylinder.

THOMAS A. BAKER.